US012669381B2

(12) United States Patent (10) Patent No.: US 12,669,381 B2

Tsao et al. (45) Date of Patent: Jun. 30, 2026

(54) METHOD AND SYSTEM FOR NON-CONTACT TEMPERATURE MEASUREMENT OF SPOT ON TARGET OBJECT

(71) Applicant: National Tsing Hua University, Hsinchu (TW)

(72) Inventors: Che-Chih Tsao, Hsinchu (TW); Guo-Sing Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 300 days.

(21) Appl. No.: 18/412,690

(22) Filed: Jan. 15, 2024

(65) Prior Publication Data

US 2024/0240991 A1 Jul. 18, 2024

Related U.S. Application Data

(60) Provisional application No. 63/439,618, filed on Jan. 18, 2023.

(51) Int. Cl.
| | |
|---|---|
| *G01J 5/53* | (2022.01) |
| *G01J 5/08* | (2022.01) |
| *G01J 5/0831* | (2022.01) |
| *G01J 5/54* | (2006.01) |
| *G01J 5/00* | (2022.01) |

(52) U.S. Cl.
CPC ............... *G01J 5/53* (2022.01); *G01J 5/0831* (2013.01); *G01J 5/0879* (2022.01); *G01J 5/54* (2013.01); *G01J 2005/0077* (2013.01)

(58) Field of Classification Search
None
See application file for complete search history.

(56) References Cited

U.S. PATENT DOCUMENTS

2008/0218849 A1 * 9/2008 Uhl ..................... G02B 21/0032
359/368

FOREIGN PATENT DOCUMENTS

JP 2005085708 A * 3/2005

OTHER PUBLICATIONS

Ethan Swansey, What are SWIR, MWIR, and LWIR—And what do they mean?, Dronegenuity, https://www.dronegenuity.com/what-are-swir-mwir-and-lwir-and-what-do-they-mean/#:~:text=The%20three%20wavelengths%20are%3A%20Short,that%20can%20detect%20radiated%20heat.
Williamson Corporation, 2018_Product_Overview_Brochure—Industrial Infrared Pyrometers, pp. 1-11, https://cdn2.hubspot.net/hubfs/297742/2018_Product_Overview_Brochure.pdf?_hstc=155894628.e5c5917c79c6f5986b15845476c4c78b.1671421292687.1672149780981.1673507542129.6&_hssc=155894628.7.1673507542129&_hsfp=1339738355&hsCtaTracking=f60d0dc4-72fc-42ed-8eda-fb6b805fee1b%7C0487fc29-7dcb-4321-a28a-bba973ec4224.

(Continued)

*Primary Examiner* — Erica S Lin

(57) ABSTRACT

A method, which is applied for non-contact temperature measurement of a spot on a target object, includes the following steps: image a thermal image of a target area on the target object and projecting the thermal image to an image plane; select an image spot in the image plane corresponding to the spot to allow corresponding light rays to pass through, while blocking all the rest of the light rays; measure a thermal radiation strength of the corresponding to light rays; and determine a temperature from the measured thermal radiation strength according to a calibration relation. A system of performing the above method is also provided.

9 Claims, 8 Drawing Sheets

(56) References Cited

OTHER PUBLICATIONS

Optris Infrared Sensing, LLC, Pyrometer optris CT 1M / 2M for high-temperature measurements of metal, https://www.optris.com/en/product/infrared-thermometers/ct-series/ct-1m/#:~:text=Pyrometer%20optris%20CT%201M%20%2F%202M,%2C%20metal%20oxides%2C%20and%20ceramics.
Fluke Process Instruments, How do Ratio Pyrometers work?, https://www.flukeprocessinstruments.com/en-us/service-and-support/knowledge-center/infrared-technology/how-do-ratio-pyrometers-work%3F.
Williamson Corporation, The Difference Between Two-Color and Dual-Wavelength Pyrometers, https://www.williamsonir.com/blog/the-difference-between-two-color-and-dual-wavelength-pyrometers/.

* cited by examiner

METHOD AND SYSTEM FOR NON-CONTACT TEMPERATURE MEASUREMENT OF SPOT ON TARGET OBJECT

CROSS REFERENCE TO RELATED APPLICATIONS

This application claims priority to the U.S. provisional Application No. 63/439,618 filed in the United States Patent and Trademark Office on Jan. 18, 2023, the disclosure of which is incorporated by reference herein in its entirety.

BACKGROUND OF THE INVENTION

1. Field of the Invention

The present invention relates to non-contact temperature measurement, especially to infrared radiation temperature measurement of a specific spot of surface area, particularly to a method and a system for non-contact temperature measurement of a spot on target object.

2. Background

There is a need for the measurement of an object surface temperature within a tiny area heated by a laser spot or by other concentrated heat source. For example, in the process of welding, either by a laser beam or by an arc, the temperature of the heated spot is an important process parameter. For another example, the process of laser drilling of a metal or a ceramic material or a semiconductor material has a similar situation where the temperature under the laser beam spot is an important process parameter. For still another example, laser heating has been applied to assist in the deposition of thin films of either metal or semiconductor materials, such as zinc oxide, especially those thin films with patterns. For yet another example, some additive manufacturing processes, or commonly called 3D printing processes, apply a focused laser to sinter or melt metal powder particles to join them into a solid. In all these examples, the temperature within the tiny, heated area is an important process parameter. However, it is generally very difficult to measure that temperature precisely. As a result, process control is usually conducted based on other parameters or by experiences. In some cases, such as welding, a human is still the most reliable controller.

However, for the need of smart manufacturing and automated process control, it will be very helpful if the temperature under a laser beam spot or an arc heating zone can be measured and constantly tracked. Yet, there is a very limited choice of commercial instrument that can be applied for this specific purpose. The most commonly used and versatile instrument is an infrared camera or an infrared video camera. These instruments usually have an IR (infrared radiation) image sensor with a format of 382×288 to 764×480 pixels and different spectra ranges covering visible, SWIR (short wavelength IR, 0.9 to 1.7 μm), MWIR (medium wavelength IR, typically 3-5 μm) and LWIR (long wavelength IR, typically 7.9-14 μm). Refer to "What are SWIR, MWIR, and LWIR—And what do they mean?", from www.dronegenuity.com/what-are-swir-mwir-and lwir-and-what-do-they-mean/, which is incorporated by reference herein in its entirety for the present invention. Using the proper lens, these instruments can observe temperature distribution of an area as well as small spots imaged by corresponding sensor pixels. However, cost is the major drawback. Except for cameras in the LWIR range, lower object temperature ranges, and small sensor formats, instruments with higher object temperature ranges and higher image resolution usually sell for over US$10,000 per unit. Another problem is that these instruments usually cover a band of wavelengths, and image sensors for specific wavelengths in the MWIR to SWIR range are rarely seen. Refer to information about IR cameras and IR image video cameras from Teledyne FLIR, www.flir.com. As a result, they are not particularly suitable for in-situ process monitoring. For on-site process monitoring and control, IR sensors or pyrometers containing a single-pixel IR sensing device for measuring the temperature of a single spot on an object are a cost-effective choice. However, the focal spot sizes of these sensor are generally larger than 1 mm, usually several millimetres, which are much larger than the laser beam spot sizes used in many laser processes. Refer to product catalogues such as Opris Infrared Measurements, "Product Overview—Non-contact temperature measurement Made in Germany", www.opris.global and Micro-Epsilon, "Thermometer//Non-contact infrared temperature sensors", www.micro-epsilon.com. FIG. 1A illustrates such a scenario, wherein a laser beam spot 300 heats up the surface of an object 100 and produces a temperature distribution profile 1A, and the centreline is represented as 101. An IR sensor 40, which includes its own internal focusing lens (not shown), is utilized for temperature measurement. The outer rays of the optical path of the non-contact measurement are represented as 50. The focal spot 1, or the measurement spot, is the area bounded by the rays 50 and is significantly larger than the laser spot 300. Within the measuring focal spot 1, the temperature distribution is non-uniform. As a result, the IR sensor can only measure a somewhat averaged temperature over the entire area covered by the focal spot, not the temperature under the laser spot. An external lens may be added in front of the IR sensor to further reduce the focal spot size, as illustrated by L3 (or 30) in FIG. 1B, which places the spot at a distance of its local length f. However, in general, it is still challenging to achieve a focused spot as small as a laser spot using only off-the-shelf lenses, which is preferred for cost reasons.

BRIEF SUMMARY OF THE INVENTION

In light of the aforementioned reasons, the present invention discloses a method and a system for non-contact temperature measurement of a spot on the surface of a target object. This is achieved using an IR sensor based on a single-pixel IR sensing device, without the need for IR imaging devices such as camera or custom-made optical lenses. The size of the spot could be on the order of 0.1 mm.

The present inventions discloses a method for non-contact temperature measurement of a spot on a target object including the following steps: image a thermal image of a target area on the object and projecting the thermal image to an image plane; select an image spot in the image plane corresponding to the target spot to allow light rays of the thermal image corresponding to the image spot to pass through while blocking passages of light rays corresponding to other parts of the thermal image; measure a thermal radiation strength of the light rays corresponding to the image spot; and determine a temperature from the measured thermal radiation strength of the light rays corresponding to the image spot according to a calibration relation.

In an embodiment, the calibration relation is established from a calibration method including the following steps: image a reference thermal image of a reference area of a known uniform temperature on a reference object and projecting the reference thermal image to the image plane; select a reference spot in the image plane to allow light rays corresponding to the reference spot to pass through while blocking passages of light rays corresponding to other parts of the reference thermal image; and measure a thermal radiation strength of the light rays corresponding to the reference spot.

In an embodiment, the thermal radiation strength of the light rays corresponding to the image spot is a first thermal radiation strength measured at a first wavelength. The calibration relation is established based on the dual-wavelength method including the following step: measure a second thermal radiation strength of the light rays corresponding to the image spot at a second wavelength.

In an embodiment, further including a step of changing a location of the image spot in the image plane such that the image spot scans over a certain area to obtain a temperature map of the target area on the target object.

The present invention also provides a system for non-contact temperature measurement of a spot on a target object, wherein the system includes a set of imaging optics, a pinhole mask, a set of collecting optics, and a thermal radiation detector. The set of imaging optics is adapted to image a thermal image of a target area on the target object and projecting the thermal image to an image plane. The pinole mask is at the image plane and is adapted to select an image spot in the image plane corresponding to the spot to allow light rays of the thermal image corresponding to the image spot to pass through, while blocking passages of light rays corresponding to other parts of the thermal image. The set of collecting optics is adapted to collect the light rays passing the pinhole mask. The thermal radiation detector is adapted to measure a thermal radiation strength of the light rays collected by the set of collecting optics.

In an embodiment, the pinhole mask includes a movable pinhole.

In an embodiment, the movable pinhole includes a movable slab with a pinhole.

In an embodiment, the movable pinhole includes a reflective type Nipkow disk.

In an embodiment, the movable pinhole includes a Digital Micromirror Device (DMD).

With the above design, the present invention introduces an innovative measurement technique featuring non-contact, cost-effectiveness, and high precision for monitoring the surface temperature of objects in machining environments, including plasma and laser applications. The present invention enables single-point measurements with a diameter of less than 200 µm at processing points, comparable to the capabilities of a thermal imager. Importantly, its cost is considerably lower than that of expensive thermal imagers. Additionally, it surpasses the minimum measurement point limitations imposed by the optical constraints of current single-point infrared temperature sensors.

4

Figure 3:
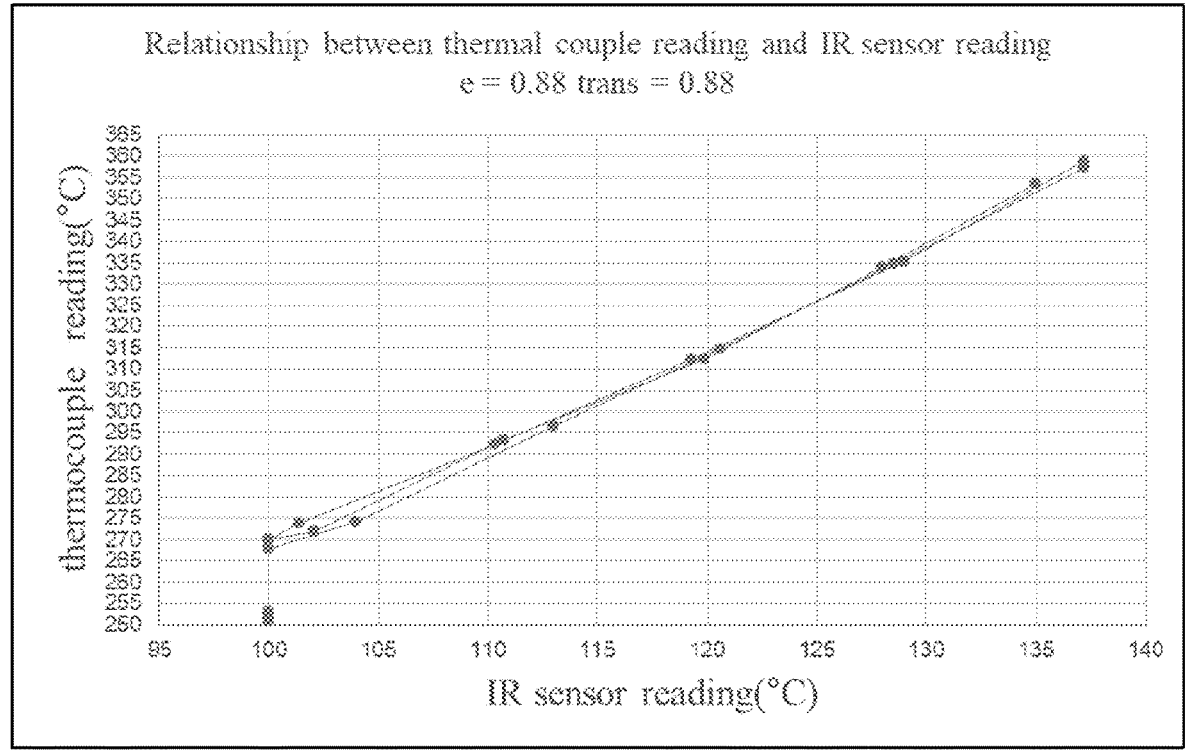
Figure 4:
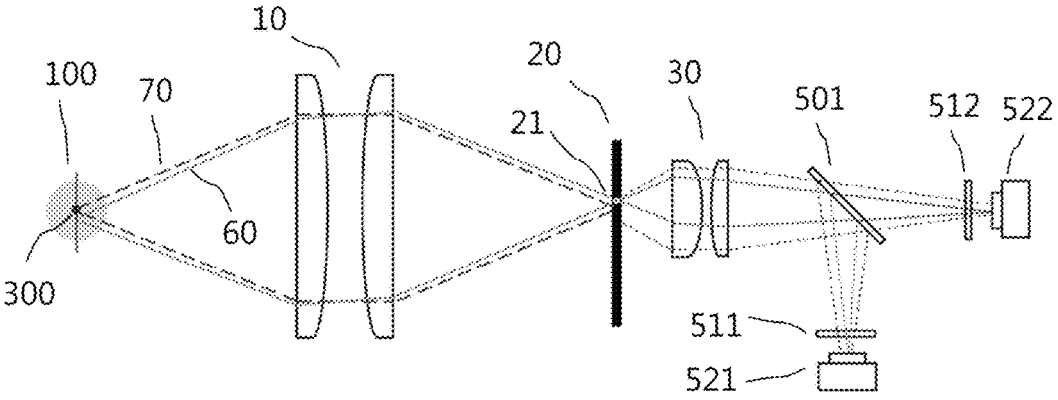
Figure 5:
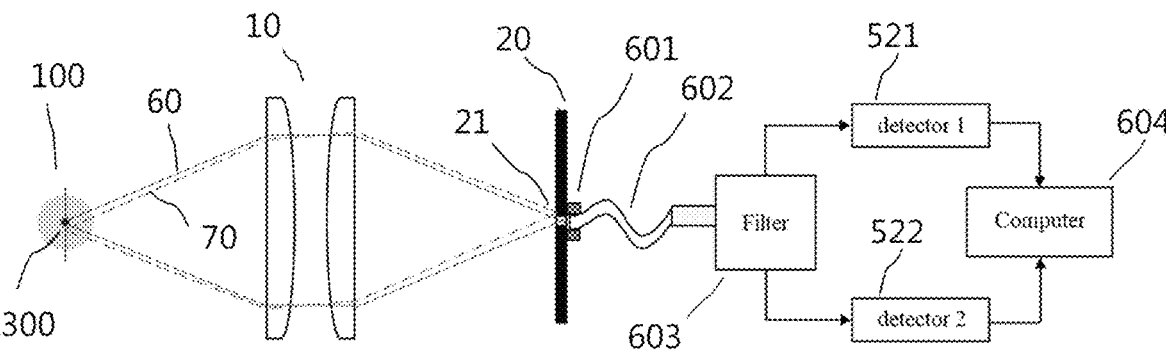
Figure 6:
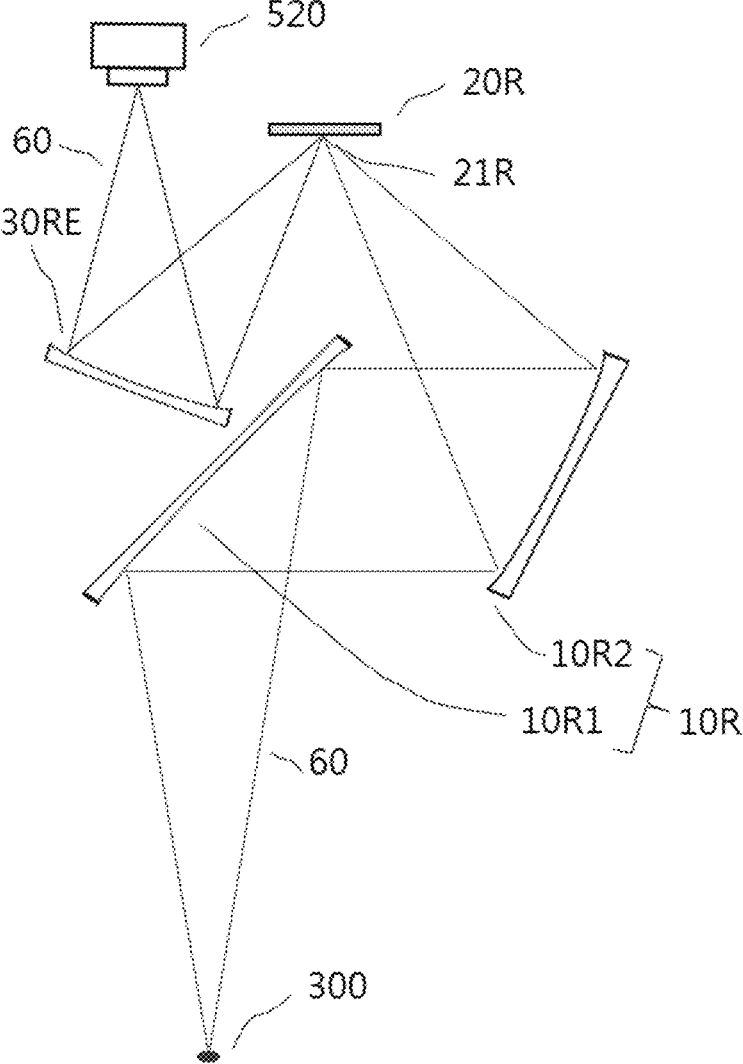
Figure 7:
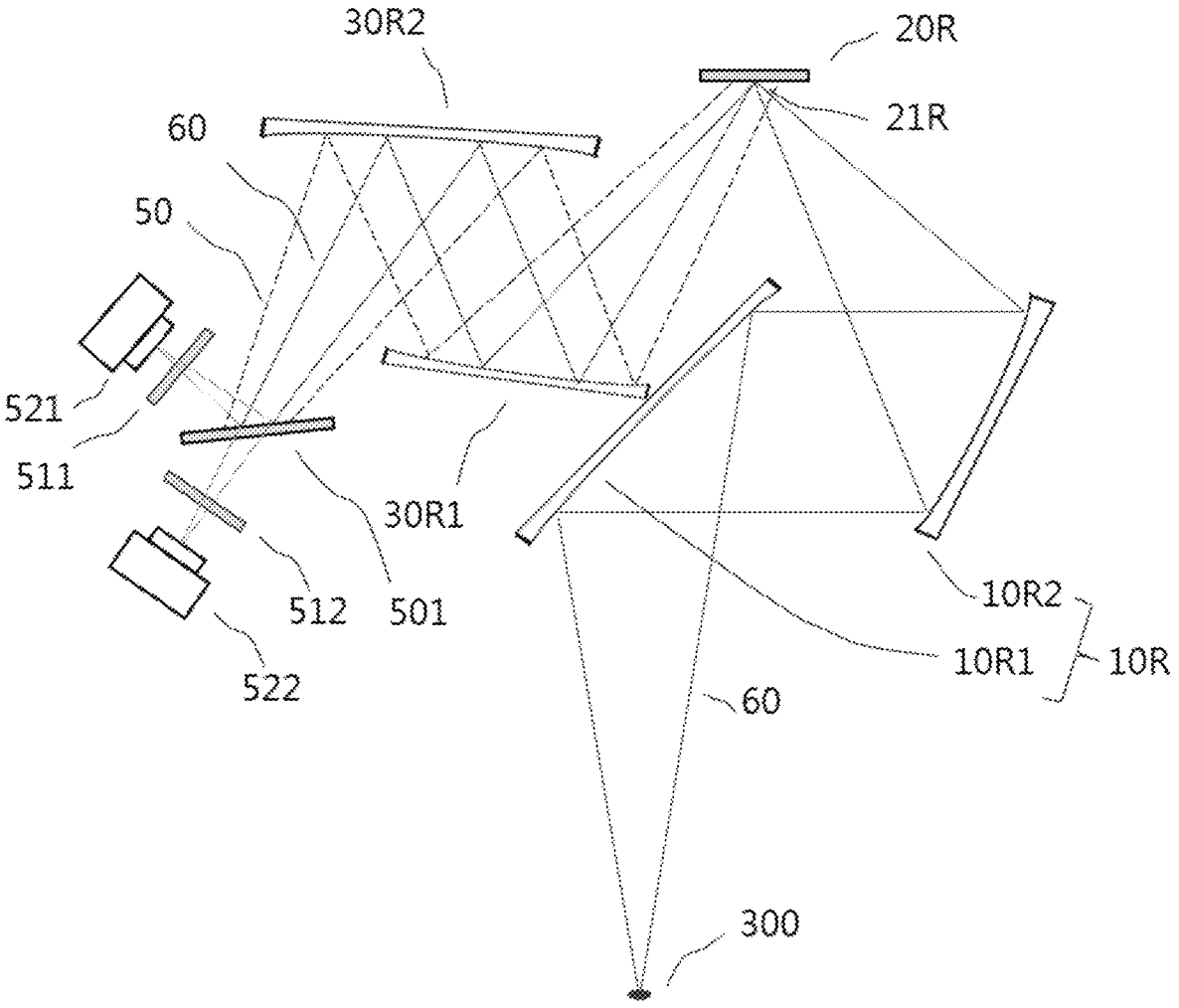
Figure 8:
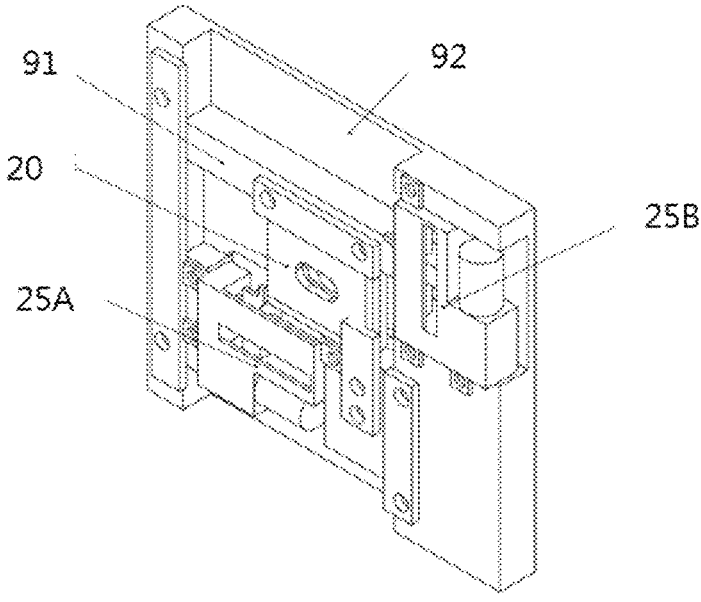
Figure 9:
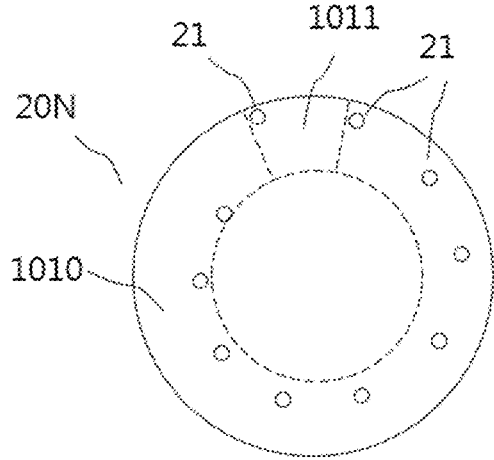
Figure 10:
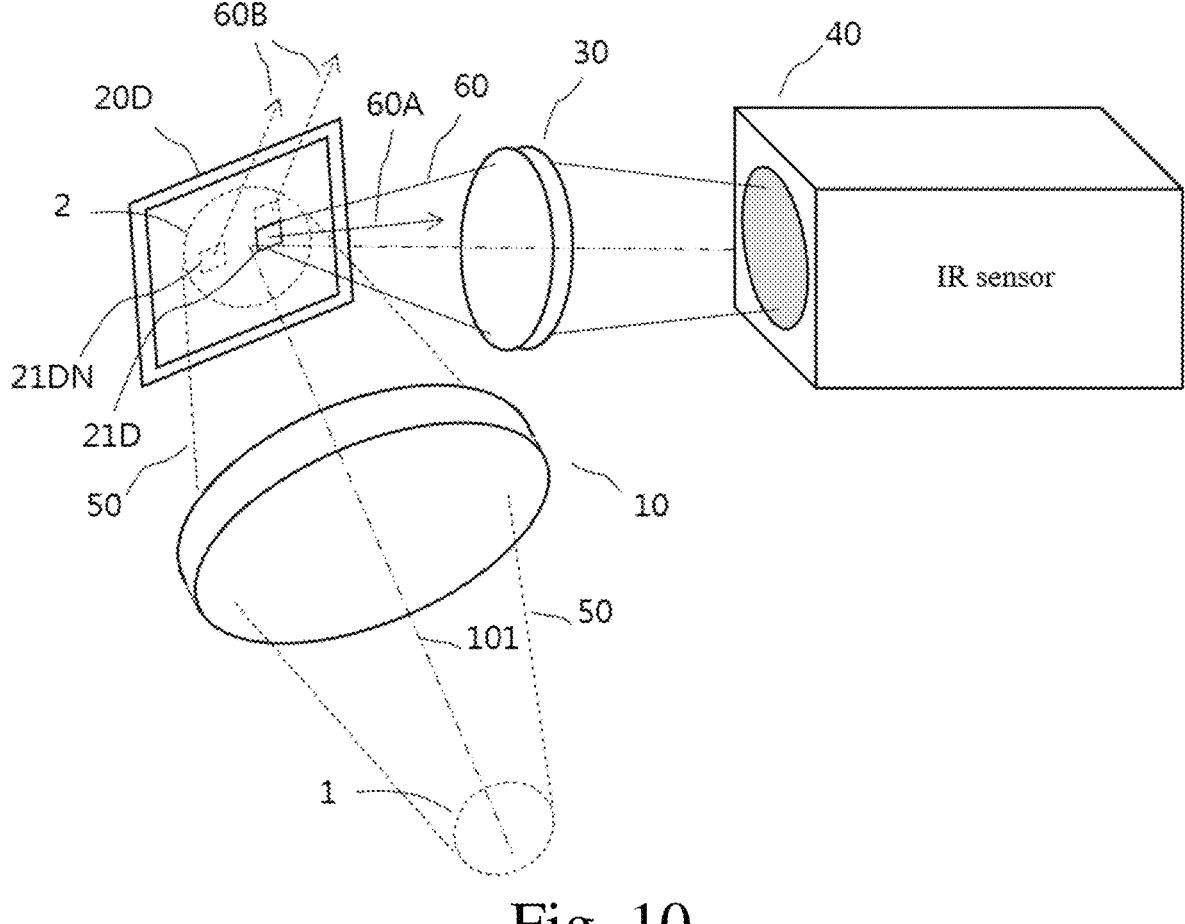

FIG. 3 is a chart showing the calibration result of an implementation base on the above embodiment;

FIG. 4 is a schematic view showing another embodiment of the present invention applying the dual-wavelength method;

FIG. 5 is a schematic view showing yet another embodiment of the present invention applying the dual-wavelength method;

FIG. 6 is a schematic view showing another embodiment of the present invention applying reflective optics;

FIG. 7 is a schematic view showing yet another embodiment of the present invention applying reflective optics and the dual-wavelength method;

FIG. 8 is a perspective view showing an implementation consisting of stages for moving the pinhole mask based on the present invention;

FIG. 9 is a top view of a rotating disk by the Nipkow disk principle for moving the pinhole mask based on the present invention; and FIG. 10 is a schematic view showing yet another implementation applying a Digital Micromirror Device for moving the pinhole mask.

DETAILED DESCRIPTIONS AND EXAMPLES

Figure 1A:
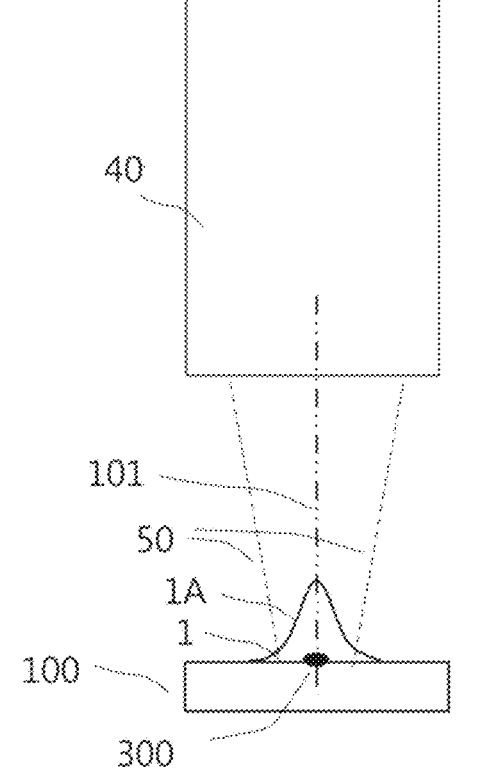
FIG. 1A and FIG. 1B are schematic views depicting situations when a conventional commercial single pixel IR sensor is used to measure the temperature of a fine spot of an area on an object surface.
Figure 1B:
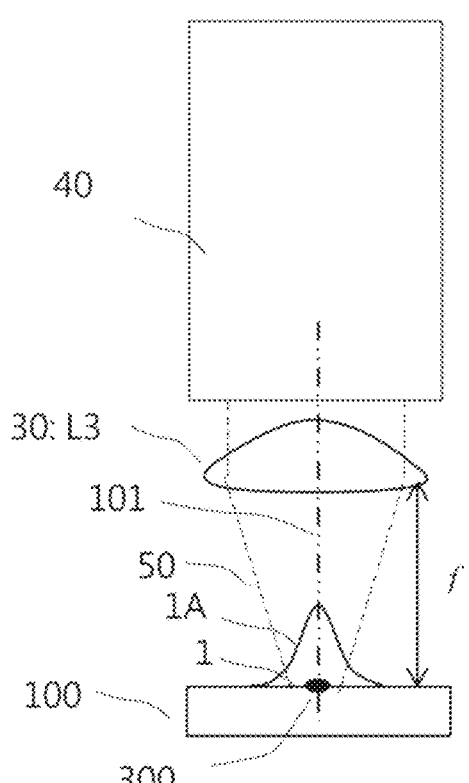
Figures 2A, 2B, 2C:
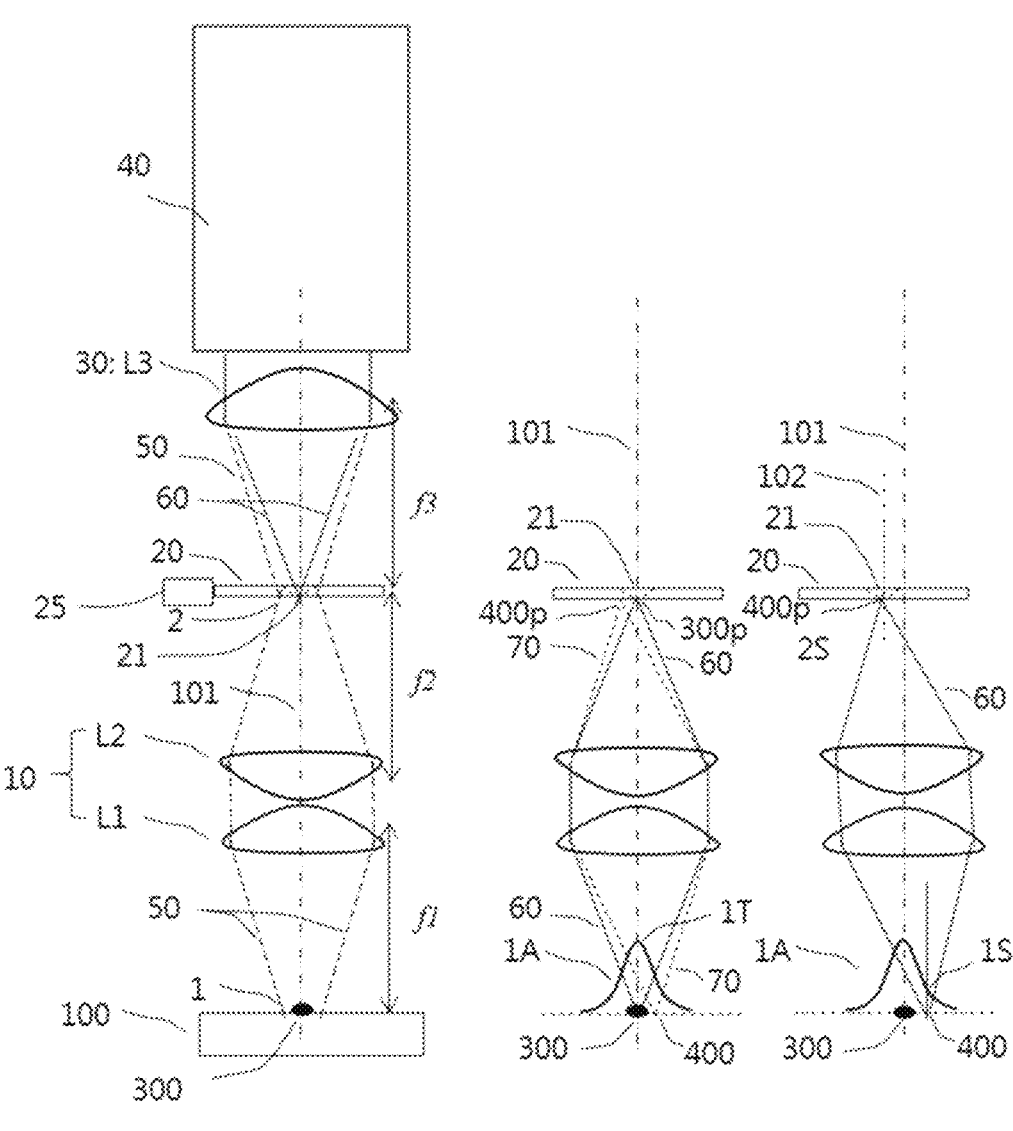
FIG. 2A is a schematic view depicting an embodiment of the present invention.
FIG. 2B and FIG. 2C are schematic views depicting the operation of the embodiment mentioned above.

As shown in FIG. 2A, an embodiment of a system of the present invention for non-contact temperature measurement includes a set of imaging optics 10, which includes condensing lens L1 and L2, and is adapted to take a thermal image at position 1 on a surface of an object 100. The set of imaging optics 10 also relays the thermal image to an image plane at position 2. In this condenser lens structure of the set of the imaging optics 10, the position 1 is at the focal point of the lens L1, which has a focal distance noted as f1, and the position 2 is at the focal point of the lens L2, which has a focal distance noted as f2. Effectively, the thermal image at position 1 is optically projected to position 2. The magnification of the projected image at position 2 is $$\text{Magnification } M = f2/f1.$$

A simple design of the set of imaging optics 10 is, as illustrated, to use two identical and non-spherical lenses L1 and L2. With such design, the light ray paths are closest to those of ideal lenses and a 1:1 image projection of the thermal image can be achieved at position 2, except that the projected image is inverted. The presented system also includes a pinhole mask 20, which includes a tiny pinhole 21 on a slab, and is located at the image plane (position 2) to block most of the thermal image and allow only a fine spot of area of the thermal image to pass through the pinhole 21. In addition, the system includes a set of collecting optics 30 and a thermal radiation detector 40, which is an IR sensor device in the current embodiment. IR rays 60 that pass through the pinhole 21 are collected by the set of collecting optics 30 (L3) before entering the thermal radiation detector 40.

By using the pinhole 21, a fine spot on the object surface, rather than the whole surrounding area, is effectively selected and only that fine spot of the area is measured. For example, as depicted in FIG. 2B, a laser beam spot 300 heats up the surface of an object 100 and produces a temperature distribution profile 1A. The peak temperature 1T is at the location of the laser spot 300 on the centreline 101. If the pinhole mask 20 is positioned in a manner that the pinhole 21 is also located on the centreline 101, then only the IR radiation from around the spot 300 will pass through the pinhole 21, because the thermal image of spot 300 is projected along the centreline 101 to reach the pinhole 21 at a location noted as 300p. As a result, the thermal information of the peak temperature 1T will pass through the pinhole 21. On the other hand, a location to one side of the centreline 101, such as where noted as 400, will have its thermal image projected to a location 400p and the pinhole mask 20 will block its IR radiation (i.e., light rays 70).

By moving the pinhole mask 20 over the image plane, the pinhole 21 can effectively "scan" over a larger area to construct a temperature map of the object surface with fine resolutions. An actuator 25 can be used to move the pinhole mask 20 on the image plane. For example, as shown in FIG. 2C, the pinhole 21, of which the location is indicated by an axis 102, is now moved and positioned slightly to the left of the centreline 101 to meet the location 400p, i.e., the projected position of the position 400 on the object. Thus, the pinhole 21 now allows the passing of the IR radiation of temperature 1S but blocks that of the peak temperature 1T. Continuous movement of the pinhole 21 over the image plane can then build a temperature map of the object surface.

The IR radiation passing through the pinhole 21 can then be measured to determine the temperature of the fine spot on the object surface that corresponds to the fine spot of the area of the thermal image that passes through the pinhole 21. The method to determine the temperature from the IR radiation passing through the pinhole can be a single wavelength method or a multi-wavelength method (most commonly the dual-wavelength method), as will be described in more details later.

Specifically, in the current embodiment, the thermal radiation detector 40 (i.e., the IR sensor) is a single pixel sensor for measuring IR radiation at a wavelength of 5 μm. The lenses used in the set of imaging optics 10 and in the set of collecting optics 30 are three identical Germanium IR lenses. The focal spot size is about 0.6 mm (without pinhole mask). The pinhole 21 is 0.2 mm in diameter. Preferably, the target object is a piece of thin glass over an aluminium block heated uniformly by an electric resistance heater controlled by a controller based on readings from several thermo-couples. FIG. 3 shows the result of calibration. The "IR sensor reading" is produced from the thermal radiation detector 40 (i.e., the IR sensor) using its original manufac-turer pre-calibration. The "thermocouple reading" is the supposed correct glass surface temperature. Three measure-ments have very consistent results. According to the chart in FIG. 3, it can be clearly understood that, when the setup measures a temperature from the IR sensor ("IR sensor reading") of, for example, 120° C., the actual glass tem-perature is about 313° C., as suggested by the "thermocouple reading", which is the temperature of that 0.2 mm specific spot in the glass surface.

Despite the above example is about temperature measure-ment of glass, the present invention can be applied to measure surface temperature of all kinds of materials. Table 1 below shows the IR radiation wavelengths of typical materials at elevated temperatures. When measuring the IR radiation of a different wavelength, a suitable IR sensor and a wavelength filter corresponding to that wavelength can be applied. As for lens materials, germanium lenses have a good focusing capability for medium to long wavelength IR radiations. For short wavelength IR radiations, lenses of calcium fluoride can be used. The applicable range of silicon lenses also covers a quite wide range of wavelength. The IR radiation and materials information is based on the following 3 sources: (1) "Single-Wavelength Pyrometers", WIL-LIAMSON CORPORATION. Application note, william-soncorp.wpenginepowered.com/wp-content/uploads/2018/05/Single-Wavelength_DS-1.pdf, (2) "2018_Product_Overview_Brochure", WILLIAMSON CORPORATION. Application note, cdn2.hubspot.net/hubfs/297742/2018_Product_Overview_Brochure.pdf?_h-stc=155894628.

e5c

5917c79c6f5986b15845476c4c78b.1671421292687.16721
49780981.1673507542129.6&_hssc=155894628.7.167350
7542129&_hsfp=1339738355&hsCtaTracking=f60d0dc4-
72fc-42ed-8eda-fb6b805fee1b %7C0487fc29-7dcb-4321-
a28a-bba973ec4224, and (3) "Pyrometer optris CT 1M/2M for high-temperature measurements of metal", Optris Infra-red Sensing, LLC. Application note, www.optris.global/optris-ct-1m-2m, which are incorporated by reference herein in their entireties for this invention. The IR lens information is from Edmund Optics catalog.

TABLE 1

| IR radiation wavelengths of common materials at elevated temperatures | |
|---|---|
| Wavelength (μm) | Materials |
| 1.0, 1.6 | High-temperature measurements of metals, metal oxides, and ceramics. |
| 2.3 | Low-temperature measurements of metals and composite materials |
| 3.43 | Thin plastic films like PE, PP and PS. |
| 5.0 | Glass |
| 7.9 | Thin plastic materials like PET, PU, PTFE, PA or CTA, and ultra-thin glass surfaces |
| 7-14 | Food, paper, rubber, textile, plastic, liquids, ice, soil, minerals, building materials, glass surface, and general purpose measurements. |

In addition to the configuration of condenser lenses, the set of imaging optics 10 can be configured differently in other embodiments. For example, in theory, a single sym-metrical lens can also be used, with position 1 and position 2 located at locations two focal lengths away from the center of the lens on opposite sides of the lens. Configurations with more projection lenses can also be used to improve the quality of projected thermal image.

While using the dual-wavelength method, the IR sensing device in the IR sensor measures the IR radiation at two slightly different wavelengths and then obtains the ratio of the two radiation strengths. From this ratio, the temperature of the source of the IR radiation can be derived. FIG. 4 shows another embodiment of the present invention apply-ing the dual-wavelength method. The arrangement from the set of imaging optics 10 to the set of collecting optics 30 is substantially the same with that shown in FIG. 2A. On the rear side of the set of collecting optics 30, a beam splitter 501 splits the light beam into two paths, one leading to the first set of filter 511 and detector 521, and the other leading to the second set of filter 512 and detector 522. The first filter 511 allows IR rays of the first wavelength to pass through so that the detector 521 measures the intensity of IR of the first wavelength. The second filter 512 allows IR rays of the second wavelength pass through so that the detector 522 measures the intensity of IR of the second wavelength.

FIG. 5 depicts another embodiment of the present inven-tion applying the dual-wavelength method. The arrangement from the set of imaging optics 10 to the pinhole mask 20 is substantially the same with that shown in FIG. 4. However, in the current embodiment, instead of a lens, an optical fiber 602 is coupled to the pinhole 21 by an optical fiber coupler 601. The optical fiber 602 is used to receive the IR light passing the pinhole. The IR light is then split and filtered in a filter unit 603 into lights of two slightly different wavelengths, each of which is then measured by one of two separate detectors 521 and 522, respectively. The signals of the measurements are then analysed by a computer 604 to determine the temperature.

In other embodiments, the optical arrangement can also use reflective optics, instead of refractive optics such as lenses disclosed in the previous embodiments. FIG. 6 shows another embodiment of the present invention applying reflective optics. Comparing with the configuration shown in FIG. 2A, the set of imaging optics 10 is replaced by a set 10R of two parabolic reflectors 10R1 and 10R2, wherein the set 10R is capable of focusing and projecting the thermal image at the target spot to the pinhole mask 20R, which is also of a reflective type. Further details are described below. The set of collecting optics 30 is replaced by an elliptical reflector 30RE, which receives the IR light rays from the reflective pinhole mask 21R and send them to the thermal radiation detector, which is an IR sensor 520 in the current embodiment.

FIG. 7 depicts another example setup of this invention applying reflective optics and the dual-wavelength method. In this embodiment, the arrangement from the set of imaging optics 10R to the reflective pinhole mask 20R is substantially the same with that shown in FIG. 6. But the elliptical reflector is replaced by a functional alternative set of collecting optics, which are parabolic reflectors 30R1 and 30R2 in the current embodiment, which are similar to the reflector set 10R disclosed above. The arrangement for dual-wavelength IR measurement is substantially the same with the arrangement shown in FIG. 4, and therefore we are not going to describe the further details herein.

There are several approaches to implement the moving pinhole (scanning pinhole) concept in other embodiments. FIG. 8 shows an implementation, which consists of stages for moving the pinhole mask 20 based on the present invention. A pinhole disk sits on a first carriage on a first translational stage 91. A first actuator 25A drives the pinhole disk so that it is movable along the first stage 91. While the first translational stage 91 carries the first actuator 25A, the carriage and the pinhole disk in turn sits on a second translational stage 92 and is drivable by a second actuator 25B. In this way, the pinhole mask 20 can be moved in two directions as required.

FIG. 9 shows another implementation taking another approach, which has a rotating disk by the Nipkow disk principle for moving the pinhole mask 20 based on the present invention. The conventional Nipkow disk features multiple pinholes 21 arranged in spiral distribution on a disk 20N such that when the disk 20N rotates, the pinholes 21 successively scan over an area 1011. To make a reflective Nipkow disk, tiny reflectors can be attached to locations 21 on the disk 20N to become reflective pinholes 21, while other areas 1010 on the disk can be made non- or low-reflective to IR radiation, for example, by using an IR transparent material such as germanium or silicon to make the disk 20N.

FIG. 10 shows yet another implementation taking yet another approach based on the present invention by applying a Digital Micromirror Device (DMD) for moving the reflective pinhole mask. Preferably, the DMD is DLP2010NIR manufactured by Texas Instruments, referring to "DLP2010NIRAFQJ", Texas Instruments application note, www.ti.com/product/zh-tw/DLP2010NIR/part-details/DLP2010NIRAFQJ. The device includes many tiny reflectors that can be programmed to change directions of reflection and can receive IR radiations. In this manner, the DMD 20D can display a tiny, moving image of a pinhole spot 21D, which includes micro-mirrors with their reflective surfaces oriented to a specific direction 60A different from the direction of reflection 60B of micro-mirrors in other areas 21DN on the device. Thus, within the area 2 of the projected IR image, only those rays reflected by the pinhole spot 21D will enter the set of collecting optics 30 and the thermal radiation detector 40 (i.e., the IR detector). Because of the programmability, the DMD device is a preferable device to create a scanning reflective pinhole.

Based on the embodiments and implementations described above, the present invention also provides a corresponding method, of which the steps illustrate the functions and movements of the components of the system. Specifically, the method includes the following steps. Frist, image a thermal image of a target area on the object and project the thermal image to an image plane; secondly, select an image spot in the image plane corresponding to the spot to allow light rays of the thermal image corresponding to the image spot to pass through while blocking passages of light rays corresponding to other parts of the thermal image. And then, measure a thermal radiation strength of the light rays corresponding to the image spot. Finally, determine a temperature from the measured thermal radiation strength of the light rays corresponding to the image spot according to a calibration relation. Additionally, there can be a further step that changes a location of the image spot in the image plane such that the image spot scans over a certain area to obtain a temperature map of the target area on the target object.

The above-mentioned calibration relation is established from a calibration method including the following steps. Frist, image a reference thermal image of a reference area of a known uniform temperature on a reference object and project the reference thermal image to the image plane. Secondly, select a reference spot in the image plane to allow light rays corresponding to the reference spot to pass through while blocking passages of light rays corresponding to other parts of the reference thermal image. Finally, measure a thermal radiation strength of the light rays corresponding to the reference spot. Specifically, the thermal radiation strength of the light rays corresponding to the image spot is a first thermal radiation strength measured at a first wavelength. In another embodiment, the calibration relation is established based on the dual-wavelength method including the step of measuring a second thermal radiation strength of the light rays corresponding to the image spot at a second wavelength.

In a nutshell, the basic concept of the method provided in the present invention is first using a set of imaging lens to take the thermal image on the target object surface and relay the thermal image to an image plane, then applying a pinhole mask, which comprises a tiny pinhole on a slab, at the image plane to block most of the thermal image and allow only a fine spot of area of the thermal image to pass through the pinhole, and finally measuring the IR radiation passing through the pinhole to determine the temperature of the target fine spot on the target object surface that corresponds to the fine spot of area of the thermal image that passes through the pinhole. That is, by using the pinhole, a fine spot on the object surface, rather than the whole surrounding area, is effectively selected and only that fine spot of area is measured. By moving the pinhole mask over the image plane, the pinhole can effectively "scan" over a larger area to construct a temperature map of the object surface with fine resolution.

The method to determine the temperature from the IR radiation passing through the pinhole can be a single wavelength method or a multi-wavelength method (most commonly the dual-wavelength method). In the single wavelength method, the absolute intensity of IR radiation of a single wavelength is measured by the IR radiation sensing device in the sensor and temperature is obtained through a pre-calibrated temperature exponent, usually set by the manufacturer. This manufacturer pre-calibration is based on the original structure of the IR sensor or pyrometer. Now since a pinhole mask is added into the optical path and blocks most IR radiation, although a temperature can still be obtained from a measured radiation using the pre-calibrated relation, this temperature no longer represents the real temperature of the object. The real temperature of the fine spot of area that was selected by the pinhole can be estimated by two methods. The first method is to make a correction of the pre-calibrated relation based on theory by correcting the actual amount of radiation received by the IR sensing device in the IR sensor as compared to the not-blocked amount of radiation. The second method is simply to use a reference object of the same properties as the target object to be measured and with a known surface temperature to make a new calibration. The temperature of the reference object for calibration can be controlled by applying one or more heating elements to it and using a separate temperature measuring device, such as a thermocouple.

In the dual-wavelength method, the IR sensing device in the IR sensor measures the IR radiation at two slightly different wavelengths and then obtains the ratio of the two radiation strengths. From this ratio, the temperature of the source of the IR radiation can be obtained. Usually, a fast switching filter mechanism, such as a filter wheel, is used to select the two wavelengths to be measured by one IR radiation sensing device. A similar method is the two-color method that applies two IR radiation sensing detectors sandwiched together, with the frontal detector for a slightly broad band and the underneath detector for a sharper band within the broad band. Refer to "How do Ratio Pyrometers work?", FLUKE Process Instruments, application note, from www.flukeprocessinstruments.com/en-us/service-and-support/knowledge-center/infrared-technology/how-do-ratio-pyrometers-work %3F, and "The Difference Between Two-Color and Dual-Wavelength note, from Pyrometers", Williamson, application www.williamsonir.com/blog/the-difference-between-two-color-and-dual-wavelength-pyrometers/, both are incorporated by reference herein in their entireties for this invention. The advantage of the dual-wavelength or the two-color method is that only the ratio of the two measurements matters, not the absolute intensity. That is, even if the pinhole mask blocks most of the IR radiation, a dual-wavelength or two-color IR sensor can still obtain a correct temperature without the need of extra correction or calibration, as long as the IR radiation is strong enough to cause a response.

The projection of thermal images of an object surface onto an image plane where the pinhole mask is located can be implemented by applying a set of lens. It can also be implemented by a set of reflectors or a combination of lens and reflectors. In reflective optics, the pinhole mask does not need to be a hole on a slab. Instead, it can be a tiny reflector attached to a basically non-reflective slab. It can also be a reflector with its surface covered with a non-reflective coating on most areas except for a tiny spot where the reflective surface is exposed as a "reflective pinhole".

Further, the pinhole mask can be made to be movable and controlled by a control system. By controlling and moving the pinhole mask on the image plane, temperatures of multiple different but adjacent spots on the object surface can be measured. This is essentially scanning a measurement point across an area over the object surface. The movement of the pinhole mask can be performed by applying a small system of stages to translate the pinhole mask in two degrees of freedom. Another approach is to apply a rotating Nipkow disk of multiple pinholes. In reflective optics, a reflective Nipkow disk can be implemented by replacing the pinholes with tiny reflective spots to become "reflective pinholes". Still another approach of movable reflective pinhole is to apply a digital micro-mirror device (DMD). The DMD can display a tiny, moving image of a spot, which comprises micro-mirrors with their reflective surfaces oriented to a specific direction different from micro-mirrors in other areas on the device. The moving spot with micro-mirrors of the specific orientation thus serves as an ideal scanning reflective pinhole.

In summary, the present innovation introduces an advanced method for measuring surface temperatures in machining environments like plasma and laser applications. This novel approach boasts characteristics of being non-contact, cost-effective, and highly precise. It enables single-point measurements at processing locations with a diameter of under 200 μm, akin to what a thermal imager can achieve. Importantly, the cost of this innovation is notably lower compared to expensive thermal imagers. Additionally, it goes beyond the limitations posed by the optical constraints of current single-point infrared temperature sensors in determining the minimum measurement point.

The present invention disclosed herein has been described by means of specific embodiments and process steps. However, numerous modifications, variations and enhancements can be made thereto by those skilled in the art without departing from the spirit and scope of the disclosure set forth in the claims.

What is claimed is:

1. A method for non-contact temperature measurement of a spot on a target object comprising:

a step of imaging a thermal image of a target area on the target object and projecting the thermal image to an image plane, the target area including the spot;

a step of selecting an image spot in the image plane corresponding to the spot to allow light rays of the thermal image corresponding to the image spot to pass through while blocking passages of light rays corresponding to other parts of the thermal image;

a step of measuring a thermal radiation strength of the light rays corresponding to the image spot; and a step of determining a temperature of the spot from the measured thermal radiation strength of the light rays corresponding to the image spot according to a calibration relation.

2. The method of claim 1, wherein the calibration relation is established from a calibration method comprising:

applying the step of imaging a thermal image of a target area on the target object to image a reference thermal image of a reference area of a known uniform temperature on a reference object with same properties as the target object and projecting the reference thermal image to the image plane;

applying the step of selecting an image spot in the image plane to select a reference spot in the reference thermal image on the image plane and applying the step of measuring a thermal radiation strength to measure a thermal radiation strength of light rays corresponding to the reference spot; and establishing the calibration relation between the thermal radiation strength of the light rays corresponding to the reference spot and the known uniform temperature on the reference object.

3. The method of claim 1, wherein the thermal radiation strength of the light rays corresponding to the image spot is a first thermal radiation strength measured at a first wavelength;

the calibration relation is established based on the dual-wavelength method for IR temperature measurement comprising an additional step of:

measuring a second thermal radiation strength of the light rays corresponding to the image spot at a second wavelength.

4. The method of claim 1, further comprising a step of changing a location of the image spot relative to the thermal image projected in the image plane such that the image spot scans over a certain area to obtain a temperature map of the target area on the target object.

5. A system for non-contact temperature measurement of a spot on a target object comprising:

a set of imaging optics for imaging a thermal image of a target area on the target object and projecting the thermal image to an image plane, the target area including the spot;

a pinhole mask at the image plane for selecting an image spot in the image plane corresponding to the spot to allow light rays of the thermal image corresponding to the image spot to pass through while blocking passages of light rays corresponding to other parts of the thermal image;

a set of collecting optics collecting the light rays passing the pinhole mask;

a thermal radiation detector for measuring a thermal radiation strength of the light rays collected by the set of collecting optics.

6. The system of claim 5, wherein the pinhole mask comprises a movable pinhole mechanism that enables the pinhole mask to select multiple image spots in the image plane in order to measure temperatures of multiple spots in the target area.

7. The system of claim 6, wherein the movable pinhole mechanism comprises a small system of stages to translate the pinhole mask in two degrees of freedom.

8. The system of claim 6, wherein the movable pinhole mechanism comprises a reflective type Nipkow disk.

9. The system of claim 6, wherein the movable pinhole mechanism comprises a Digital Micromirror Device (DMD).

* * * * *